United States Patent

Burger et al.

[15] 3,676,752
[45] July 11, 1972

[54] ALUMINUM ELECTROLYTIC CAPACITOR

[72] Inventors: Francis J. P. J. Burger; Jie Chu Wu, both of Toronto, Ontario, Canada

[73] Assignee: Sprague Electric Company, North Adams, Mass.

[22] Filed: March 19, 1971

[21] Appl. No.: 126,234

[52] U.S. Cl. ............................................317/230, 252/62.2
[51] Int. Cl. .................................................................H01g 9/02
[58] Field of Search ....................................317/230, 231, 233

[56] References Cited

UNITED STATES PATENTS

| | | | |
|---|---|---|---|
| 1,891,207 | 12/1932 | Ruben | 317/230 |
| 1,998,202 | 4/1935 | Robinson | 317/230 |
| 2,022,500 | 11/1935 | Clark et al. | 317/230 |
| 2,024,210 | 12/1935 | Edelman | 317/230 |

Primary Examiner—James D. Kallam
Attorney—Connolly & Hutz

[57] ABSTRACT

Undesirable anodic side reactions in aluminum electrolytic capacitors are controlled by employing glycol-based electrolytes which include additives of less than 2 percent of selected alpha-hydroxy carboxylic acids and their salts.

5 Claims, 1 Drawing Figure

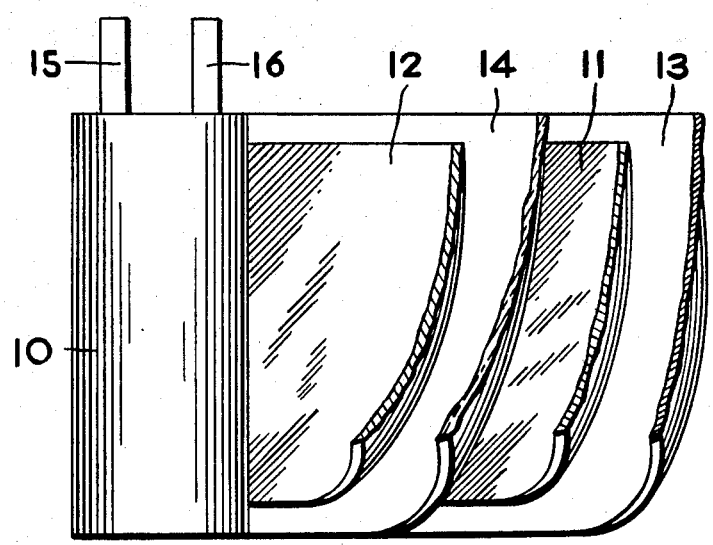

ALUMINUM ELECTROLYTIC CAPACITOR

BACKGROUND OF THE INVENTION

This invention relates to aluminum electrolytic capacitors having high breakdown voltages, and more particularly relates to aluminum electrolytic capacitors having electrolytes with extended voltage capabilities.

We have recently disclosed to the art that predicting the breakdown voltage of electrolytic capacitors can be based solely on the resistivity of the working electrolyte in the capacitor. We have established the rule that the breakdown voltage $V=130(1+\log_{10}\rho)$, where $\rho$ is the resistivity of the electrolyte at the test temperature. The rule has been found to be strictly applicable at temperatures of 65° C. and above, although actual voltages will be slightly below the prediction by the rule at lower temperatures. However, attainment of the predicted upper limit of breakdown requires the control of side reactions in the capacitor. The side reactions in an electrolyte that must be controlled to achieve optimum breakdown include anodic oxidation of solvents or an iron species, etching or corrosion of the capacitor anode, interference with the anodization or destruction of existing anodic oxide on a capacitor anode.

It is an object of this invention to control anodic side reactions in aluminum electrolytic capacitors. Another object of this invention is the provision of electrolytes that have superior tolerance toward contamination with known corrosive agents, in particular chloride ions. A further object is the provision of electrolytes that show compatibility toward metallic impurities on aluminum anodes.

SUMMARY OF THE INVENTION

The aluminum electrolytic capacitors of this invention employ glycol-borate electrolytes having the addition of small amounts of selected alpha-hydroxy carboxylic acids and their salts to curb undesirable anodic side reactions in the capacitor.

The electrolyte of the capacitor of this invention is identified broadly as a glycol-based electrolyte to indicate that the major portion of the solvent is a glycol. The term glycol is intended to include such established electrolyte solvents as ethylene glycol or other polyhydric alcohols as well as monoethers of ethylene glycol such as methyl or ethyl cellosolve, or mixtures thereof.

This invention is applicable to electrolytes having mixed solvents in which the glycol is the major member. Additional solvent components may include known prior art compatible cosolvents, such as butyrolactone and N-methylpyrrolidone Di- N- substituted formamides or acetamides.

The electrolyte of this invention is substantially nonaqueous, although less than 4 percent water originating either from deliberate addition or from water of crystallization of the solutes may be present.

Suitable solutes for the electrolytes of this invention are the borates, preferably in the form of ammonium or alkyl substituted ammonium pentaborate, or pentaborates of other N-substituted bases, or borates of sodium or lithium.

The additives of this invention which provide the control over undesirable anodic side reactions are identified generally as alpha-hydroxy carboxylic acids and their salts. Included within this general heading are the aliphatic alpha-hydroxy carboxylic acids having at least two carboxyl groups such as citric, tartaric, tartronic and malic. Also included are the aromatic alpha-hydroxy carboxylic acids such as salicylic, 1-hydroxy-2 naphthoic, 2-hydroxy-1 naphthoic, and 2-hydroxy-3 naphthoic. Also included are the boron complexes of the foregoing aliphatic and aromatic acids as exemplified by borodisalicylic acid. Analogous complexes of boron containing such aliphatic and aromatic acids other than salicylic acid as have been listed above, have been described in the scientific and patent literature and are to be included as being within the scope of this invention.

The above listed acids may be present as acids or in the form of salts. The cations of the salts being selected from the group that includes ammonium, carbyl substituted ammonium, hydroxy carbyl substituted ammonium, and morpholine. The carbyl groups or hydroxy carbyl groups may be combinations of $C_1$ to $C_{18}$ groups, the main requirement being that the acids or salts must be sufficiently soluble in the electrolyte over the requisite temperature range.

The concentration in which the listed compounds must be present in the electrolyte to be effective may vary depending on specific characteristics such as acid strength, molecular weight, etc.; but will in general be small, i.e., about less than 2 percent and often considerably less to a lower limit of about 0.02 percent, although slightly larger concentrations have not been found to be detrimental to the control achieved by the small additions. The upper limit is subject of course to solubility limitations and the undesirable etching activity of the additives. The lower limit of operability for practical purposes is about 0.02 percent in order to obtain measurable evidence that the desired control of the side reactions has been achieved. In general the amount of additive required to achieve the objectives of this invention is directly related to the amount of solute; in particular, the more pentaborate there is in the electrolyte, the more additive is used.

BRIEF DESCRIPTION OF THE DRAWING

The sole FIGURE of the drawing shows an electrolytic capacitor constructed in accordance with this invention.

Capacitance section 10 is shown in partly unrolled condition so as to expose portions of electrodes 11 and 12. One or both of electrodes 11 and 12 has a dielectric oxide compound of the electrode material on its surfaces. The electrolyte of the capacitor combination of this invention is specifically directed to a construction in which electrodes 11 and 12 are of high purity (99.99 percent) aluminum, and the dielectric film on one or both electrodes 11 and 12 is aluminum dioxide. Separators 13 and 14 are preferably of absorbent material so as to facilitate maintenance of an electrolyte in contact with electrodes 11 and 12. Tabs 15 and 16 are connected to electrodes 11 and 12, respectively, to provide terminals for capacitance section 10.

Any suitable capacitor casing may be employed with the capacitor of this invention. The tab-wound construction shown in the drawing permits the use of either a conductive or nonconductive casing. Other capacitor constructions, such as the well-known riser-wound construction, require the use of a conductive casing, preferably of the same material as the electrodes, to which the cathode is joined.

DESCRIPTION OF THE PREFERRED EMBODIMENTS

It is theorized from the chemical constitution of the aforementioned acid additives that the common factor which makes them useful in the context of this invention namely the grouping

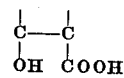

does so because it imparts chelating properties to the molecule which enables complexes to be formed not only with boron, but also with heavy metal impurities that might be present as discrete spots on the anodic surface. These could be catalytically active and form starting centers for the side reactions that have to be inhibited or suppressed, as was explained earlier.

The effectiveness of the electrolyte additives according to this invention can be demonstrated readily, i.a., by carrying out formation experiments with and without the relevant additives, by reference to the following examples in which use is made of typical electrolyte formulations that are commonly known in the prior art. The following examples are intended to demonstrate the effectiveness of the additives according to this invention in two different ways. One way is by showing that formation can proceed to a higher formation voltage than in an electrolyte that has no additive, but is otherwise identical with the first. The second way is by showing a difference in the attainable formation voltage in the presence of deliberately added chloride contamination in the electrolyte. What is thus demonstrable is a greater chloride tolerance in the case of the electrolyte improved by the added inhibitor as against an electrolyte that has no such additive.

As a further criterion of the effectiveness of the additives according to the invention, it is useful to note the state of the metal surface after formation, as revealed by inspection both by eye as well as by microscope. A bright surface and absence of corrosion is indicative of a satisfactory electrolyte formulation.

Examples 1 to 9 establish the improved breakdown voltages achieved in aluminum electrolytic capacitors employing the additives of this invention. The anodized electrodes of these examples are plain 99.99 percent aluminum foil formed at a current density of 1 ma/cm$^2$ of projected foil area. The electrolyte was 32 parts (by weight) ammonium pentaborate in 68 parts ethylene glycol and had a pH of 4.9 and a resistivity of 1,030 (ohm-cm) at 25° C. and 110 at 85° C. The predicted breakdown voltage according to our aforementioned rule was 520 at 25° C. and 395 at 85° C.

| Ex. No. | Additive | Amount Added g/100g Electrolyte | Breakdown Volts 25°C | 85°C |
|---|---|---|---|---|
| 1 | Nil | ......... | 380 | 280 |
| 2 | Citric Acid | 0.5 | 450 | 400 |
| 3 | Malic Acid | 0.75 | | |
| 4 | Tartaric A. | 0.5 | | |
| 5 | Salicyclic A. | 0.2 | | |
| 6 | 3 Hydroxy 2 Naphthoic A. | 0.27 | 465 | 400 |
| 7 | Note (1) | 0.5 | | |
| 8 | Note (2) | 0.75 | | |
| 9 | Note (3) | 0.75 | | |

NOTES: (1)Tetra methyl ammonium boro-di-salicylate
(2)Tetra methyl ammonium boro-di 1 Hydroxy-2-naphthoate
(3)Tetra ethyl ammonium boro-di- 2-Hydroxy 1 naphthoate Summarizing the results of examples 1–9, it is noted that the addition of from 0.2 to 0.75g per 100g of electrolyte of the additive proposed according to the invention results in the breakdown voltage at 25° C. being raised from 380 volts (with no additive being present) to 465V (with the additives present as listed). The corresponding figures for the temperature of 85° C. are 280V (without additive) raised to 400V (with additive present).

It is of note that additions of acids which would be excluded, according to the definitions given earlier, namely, e.g., aliphatic acids that either do not contain a hydroxyl group in alpha position to the carboxylic group or have only one carboxylic group instead of the minimum of two required, or aromatic acids that have no hydroxyl group in the α-position to the carboxylic group are demonstrably unable to produce the effects described in examples 1 to 9.

In particular, such acids as glycolic, lactic, formic, acetic, phthalic have not shown any activity of the kind demonstrated with the acids which are included as useful according to the definition given in this application.

In a like manner, the compositions of an electrolyte described containing a small proportion of a co-polymer of maleic anhydride and methyl vinyl ether are in no way anticipatory of the present invention, since (1) the said polymer possesses quite a different structure (no α-hydroxy groups present) and (2) the polymer is unable to prevent a reaction secondary to anodization proper from taking place; as can be readily demonstrated by the fact that a grey coating is formed during anodization. Moreover the anodization takes a multiple of the time required for a formation to the same voltage while using an electrolyte as specified by the present invention.

Equally ineffective in the context of this invention have proved themselves to be aromatic di-phenols, such as pyrocatechol and the like or their boron complexes and their salts such as, e.g., borodicatecholate and its ammonium or alkyl substituted ammonium salts, such as have been described in DMF based compositions.

Examples 10–18 demonstrate the improved chloride tolerance of the electrolyte capacitor anode systems resulting from the presence of the additives as specified according to this invention. The anodes and electrolyte are as in examples 1–9.

Chloride Additions: Chloride was added directly to the electrolyte, as NaCl.
Temperature: 85°C.

| Ex. No. | p.p.m. Cl | Additive | Amount Added g/100g Electrolyte | Breakdown Volts | Notes |
|---|---|---|---|---|---|
| 10 | 10 | — | 0 | 300 | (1) |
| 11 | 10 | Salicylic Acid | 0.2 | 400 | — |
| 12 | 10 | Citric Acid | 0.5 | 400 | — |
| 13 | 50 | — | 0 | 255 | (2) |
| 14 | 50 | Salicylic Acid | 0.32 | 400 | — |
| 15 | 50 | Citric Acid | 1.5 | 340 | (1) |
| 16 | 50 | Tartaric Acid | 1.0 | 400 | — |
| 17 | 100 | — | 0 | 290 | (3,4) |
| 18 | 100 | Salicylic Acid | 1.0 | 400 | — |

NOTES: (1)A few localized, brown, "tree" like corrosion spots visible on anode surface.
(2)Widely scattered corrosion spots visible on anode surface.
(3)Formation rate became very slow above 130V.(4)Massive corrosion visible on anode surface.

Summarizing the results of examples 10–18 it was found that additions of from 0.2g to 1.5g per 100g, based on the chloride-contaminated electrolyte, of the organic α-hydroxy acids as specified above according to this invention resulted in an increase of the limiting formation voltage (breakdown voltage) of from 85 to 145 volts, i.e., the results demonstrate an increased chloride tolerance.

What is claimed is:

1. An aluminum electrolytic capacitor comprising at least two aluminum electrodes, at least one of said electrodes having a dielectric oxide film thereon, an electrolyte in contact with said electrodes, said electrolyte having a predominantly glycol solvent and a predominantly borate solute, said electrolyte further having an additive of from about 0.02 percent to less than about 2 percent of a member selected from the group consisting of aliphatic alpha-hydroxy carboxylic acids having at least two carboxyl groups, aromatic alpha-hydroxy carboxylic acids, salts thereof, and boron complexes thereof.

2. The capacitor of claim 1 wherein said additive is selected from the group consisting of citric, tartaric, tartronic and malic acids and salts thereof.

3. The capacitor of claim 1 wherein said additive is selected from the group consisting of salicylic, 1-hydroxy-2 naphthoic, 2-hydroxy-1 naphthoic, and 2-hydroxy-3 naphthoic acids, and salts thereof.

4. The capacitor of claim 1 wherein said additive is selected from the group consisting of boron complexes of citric, tartaric, tartronic, malic, salicylic, 1-hydroxy-2 naphthoic, 2-hydroxy-1 naphthoic, and 2-hydroxy-3 naphthoic acids, and salts thereof.

5. The capacitor of claim 1 wherein said additive is selected from salicylic acid, salts of salicylic acid, boron complexes of salicylic acid, and salts of boron complexes of salicylic acid.

* * * * *